United States Patent

[11] 3,621,953

[72] Inventor Thomas R. Smith
    Newton, Iowa
[21] Appl. No. 886,156
[22] Filed Dec. 18, 1969
[45] Patented Nov. 23, 1971
[73] Assignee The Maytag Company
    Newton, Iowa

[54] BRAKE-RESPONSIVE MOTOR CONTROL
    10 Claims, 6 Drawing Figs.
[52] U.S. Cl. .................................................. 192/1
[51] Int. Cl. ......................................... F16d 67/02
[50] Field of Search ........................................ 192/1, 2,
    11, 8, 136; 210/368; 68/23 R

[56] References Cited
    UNITED STATES PATENTS
2,422,909  6/1947  Kangas ....................... 192/2
3,367,459  2/1968  Rubin ........................ 192/11

Primary Examiner—Benjamin W. Wyche
Assistant Examiner—Randall Heald
Attorneys—William G. Landwier and Richard L. Ward ABSTRACT: A brake device includes a pivotally mounted arm engageable with a drive belt. The pivotally mounted arm is self actuating for applying a braking drag to the belt responsive to deenergization of the motor. A switch is positioned juxtaposed the brake arm and responsive to movement of the brake arm to the braking position for maintaining the motor deenergized during the braking operation.

INVENTOR
THOMAS R. SMITH
BY
William G Landwier
AGENT

PATENTED NOV 23 1971 3,621,953
SHEET 3 OF 3
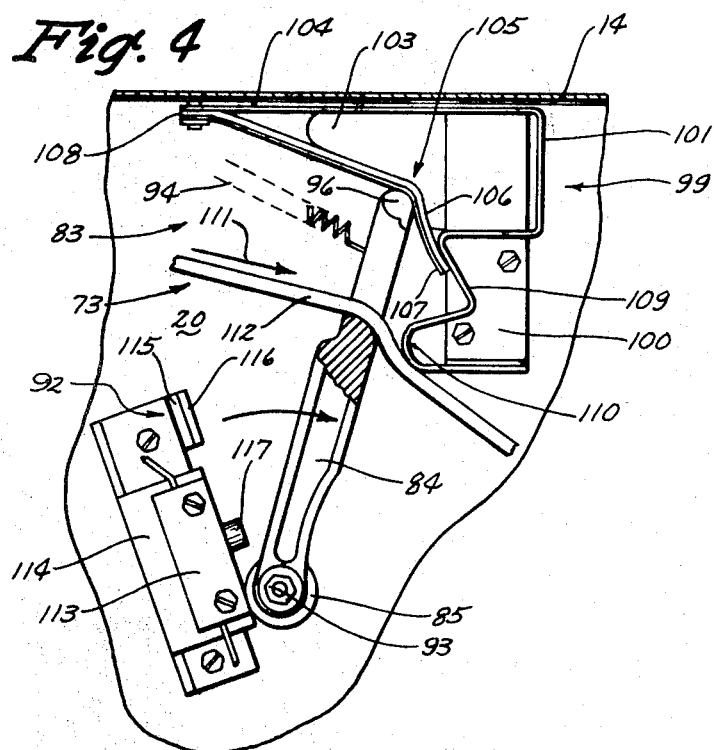
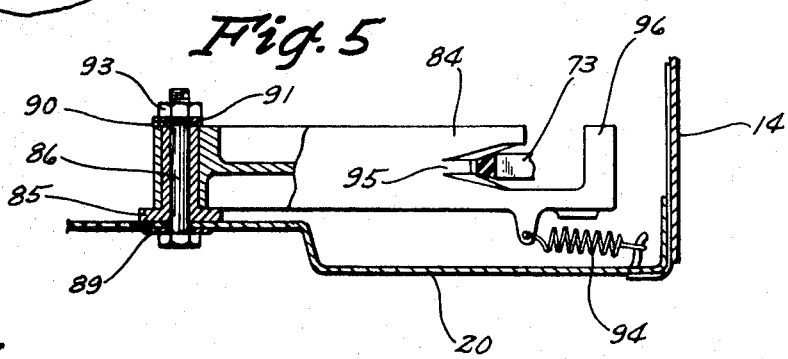
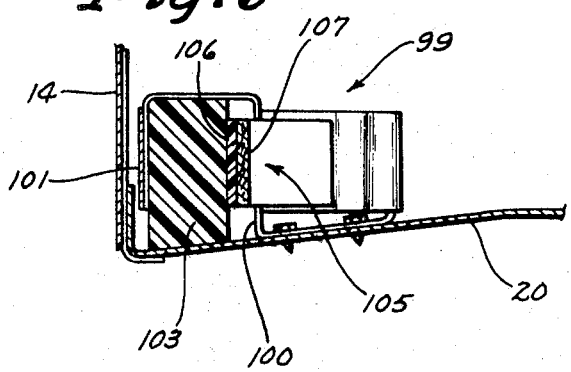
INVENTOR
THOMAS R. SMITH
BY
William G. Landwier
AGENT

3,621,953

BRAKE-RESPONSIVE MOTOR CONTROL

BACKGROUND OF THE INVENTION

1. Field of the Invention

This invention relates to control mechanisms for a rotating apparatus and more particularly to a brake-responsive motor control in which energization of the drive means is prevented during operation of a self-actuating brake mechanism.

2. Description of the Prior Art

Prior art includes use of remote controlled, selectively actuatable friction devices engageable with a drive belt to apply a drag on the belt to effect a braking of the rotating member. In these remote controlled brakes it is a simple procedure to also deenergize the motor upon energizing the brake. In a self-actuating belt brake system, however, it is more difficult but equally desirable to insure deenergization of the motor during operation of the belt brake.

SUMMARY OF THE INVENTION

It is therefore an object of the instant invention to provide an improved brake-responsive control device for a centrifugal extractor apparatus.

It is a further object of the instant invention to provide an improved brake-responsive motor control useful with a self-actuating brake in a belt-driven centrifugal extractor apparatus.

It is still a further object of the instant invention to provide a brake responsive motor control for preventing energization of the motor until operation of a self-actuatable belt brake brings the rotating member to a substantially complete stop.

These objects are achieved in a centrifugal extractor apparatus as included in a washing machine wherein the extractor apparatus is driven by a motor through an endless belt and wherein a belt brake mechanism is self actuatable for reducing the speed of rotation of the extractor responsive to a predetermined condition. Energization of the motor is controlled by means responsive to the brake mechanism to prevent energization of the motor while the brake mechanism is actuated.

Operation of the device and further objects and advantages thereof will become evident as the description proceeds and from an examination of the accompanying three pages of drawings.

DESCRIPTION OF THE DRAWINGS

The drawings illustrate a preferred embodiment of the invention with similar numerals referring to similar parts throughout the several views, wherein:

FIG. 4 is a fragmentary view showing further details of operation of the instant invention;

FIG. 5 is a fragmentary view of the movable member included in the brake mechanism of the instant invention; and FIG. 6 is a fragmentary view, partially in section, showing further components of the brake mechanism of the instant invention as taken along line 6—6 of FIG. 2.

DESCRIPTION OF THE PREFERRED EMBODIMENT

Figure 1:
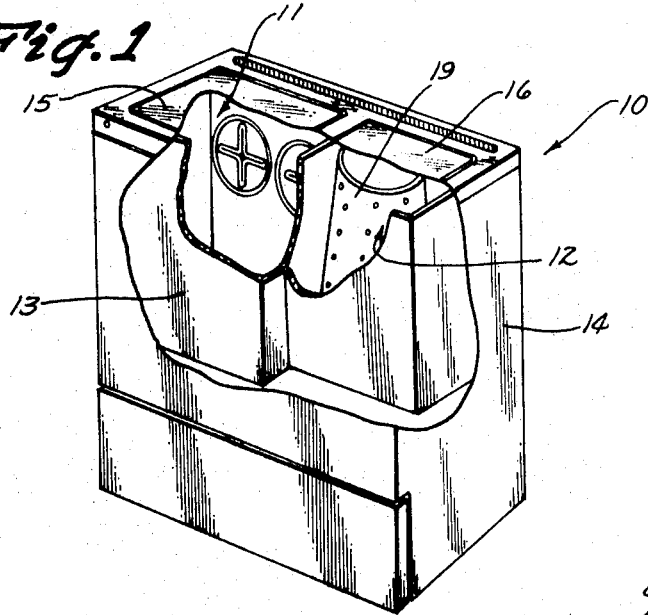
FIG. 1, located in a lower portion of the first page of drawings, shows a simplified perspective view of a laundry machine including a centrifugal extractor apparatus.

Referring to FIG. 1, there is shown a laundry machine 10 including washing and centrifugal extraction portions 11 and 12 enclosed within a tub 13 and in turn in a cabinet structure 14. The washing and centrifugal extraction portions 11 and 12 are individually accessible through a pair of lids 15 and 16. The instant invention is primarily directed to the centrifugal extraction portion 12 of the laundry machine 10 and to the control of rotation of the perforated fabric container 19.

Referring to the plan view of FIG. 2 and to the vertical section of FIG. 3, the mounting of the centrifugal extractor and the drive system for the rotatable fabric container 19 will be described. The cabinet structure 14 is mounted on a base member 20 that is in turn supported on a horizontal surface 21 by a plurality of casters 22. The tub 13 within the cabinet structure 14 defines a fluid container 23 in which is disposed the rotatable fabric container 19. A substantially horizontal divider or bulkhead 24 is positioned below the tub 13 and defines a lower chamber 25 for the drive system of the washing apparatus.

The fabric container 19 is fixed to a hub 33 and in turn to a shaft 34 and is rotatable within the fluid container 23. A seal assembly 35 is positioned at the bottom of the fluid container 23 substantially coaxial with the shaft 34 a is operable for closing the bottom of the container 23 and providing a dynamic seal connection with the hub 33. The seal assembly 35 includes a convoluted portion 36 and permits nutational movement of the fabric container 19 relative to the tub 13 during rotative operation of the centrifugally driven fabric container.

The mounting of the fabric container 19 further includes a weighted coupling member 39 fixed to shaft 34 by a pair of clamping bolts 38 and providing a coupling of the shaft 34 to a driven pulley 40. The driven pulley 40 is attached to the weighted coupling member 39 by a plurality of threaded members 41. The spinner assembly 42, including the container 19, hub 33, shaft 34, coupling 39, and driven pulley 40, is in turn rotatably supported on a resilient mounting assembly 43 fixed to the base member 20. The resilient mounting assembly 43 includes a resilient flexible portion 44 permitting nutational movement of the spinner assembly 42 relative to the base 20. A bearing 45 is provided between the resilient mount and the spinner assembly.

Further details of construction and mounting of the centrifugal extractor is shown in the copending application entitled "Centrifugal Extractor Mounting" filed by Edward O. McCartney on the date of filing of the instant invention.

Figure 2:
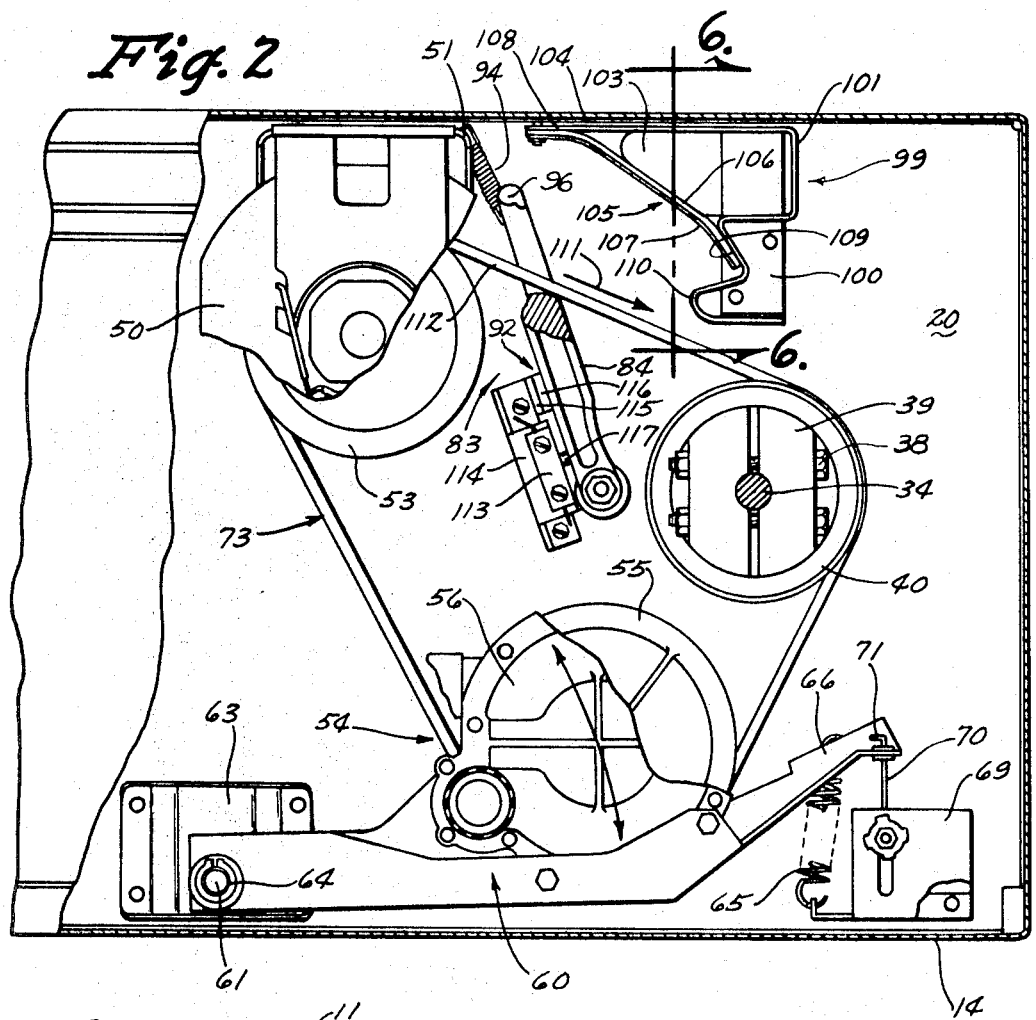
FIG. 2 is a plan view partially in section showing the subject matter of the instant invention and taken generally along lines 2—2 of FIG. 3.
Figure 3:
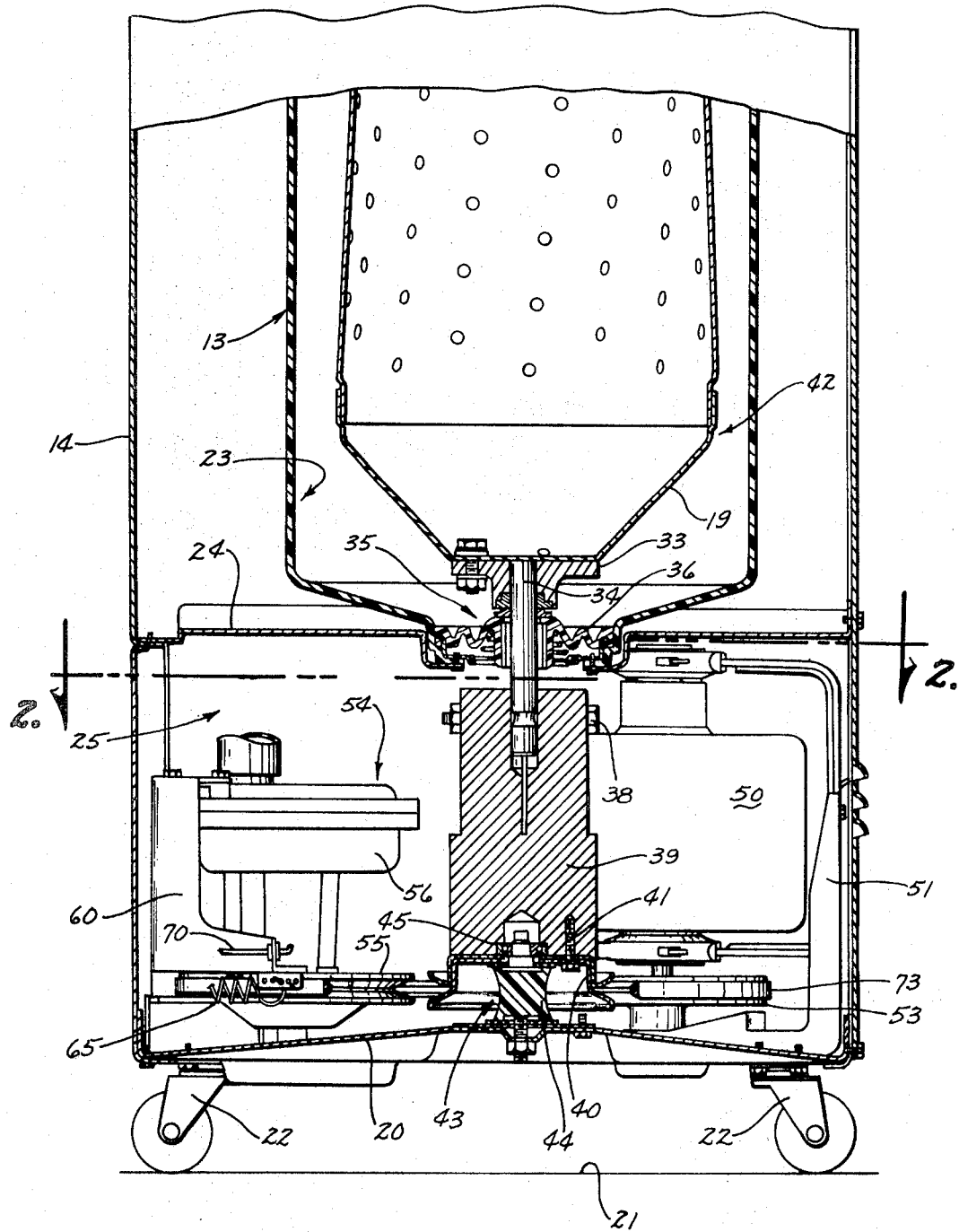
FIG. 3 is a vertical section view of the centrifugal extractor portion of the washing apparatus of FIG. 1.

The drive system for the centrifugal extractor is best shown in FIG. 2 and includes an electrically energizable motor 50 rigidly mounted on the base 20 through mounting bracketry 51 and having a drive pulley 53 disposed at the lower end of the motor 50 in substantially the same horizontal plane as the driven pulley 40 of the spinner assembly 42.

The laundry machine further comprises fluid pumping means 54 operable for controlling fluid flow in the fluid system of the laundry machine and including a pulley 55 substantially aligned in the horizontal plane of the driving pulley 53 and the driven pulley 40. The pump pulley 55 is driven by the motor 50 for operating the pump 56 but in addition the pumping means 54 is pivotally mounted on the base frame 20 so that the pump pulley 55 is operable as an idler in the drive system of the extractor.

The pumping means 54 is secured to an elongated pump-supporting bracket 60 that is in turn pivotally supported on a pivot pin 61 at one end. The pivot pin 61 is secured to a mounting bracket 63 that is securely mounted to the base 20. The pump-supporting bracket 60 is in turn retained on the pivot pin 61 by a retaining ring 64. The pump-supporting bracket 60 is biased in a clockwise direction about the pivot pin 61 by a spring 65 connected between the outwardly extending arm 66 of the pump supporting bracket 60 and a fixed bracket 69 mounted on the base frame 20. A stop member 70 is adjustably connected to the fixed bracket 69 and includes a finger 71 engageable with the pump-supporting bracket 60 for limiting movement of the pumping means 54 in the counterclockwise direction during a belt-braking operation as will be more fully shown hereinafter. A V-belt 73 drivingly connects the driving pulley 53 to the driven pulley 40 and the pump pulley 55.

Referring now to FIGS. 2 and 4 through 6, there is shown a control system indicated generally by numeral 83, associated with the drive belt 73 and responsive to specific conditions of the drive belt 73 for effecting a control function of the extractor apparatus. In the instant embodiment, the control system 83 is operable for applying a frictional drag to the belt 73 for effectively reducing the speed of rotation of the spinner assembly 42.

A movable member is included in the control system 83 of the instant invention in the form of a brake arm member 84 pivotally mounted on the base 20. As best shown in FIG. 5, the pivotal mounting includes a flanged sleeve bearing 85, a bolt 86 extending through the sleeve bearing, a pair of washers 89 and 90, a lock washer 91, and a nut 93. Referring to FIG. 2, the brake arm member 84 is biased about the pivot mounting away from the belt 73 against a stop 92 by a spring member 94 connected between the brake arm member 84 and the base 20. The belt is positioned so that there is little or no contact between the belt 73 and the brake arm member 84 while the motor is at rest and during normal motor driven operation of the spinner assembly.

Referring again to FIG. 5, the brake arm member 84 includes a V-slot 95 corresponding substantially to the shape of the V-belt 73 for frictional engagement with the sides of the V-belt 73. As previously indicated, the brake arm 84 is positioned so the V-slot 95 has little or no frictional drag on the V-belt 73 during normal motor driven operation of the centrifugal extractor.

The pivotally mounted brake arm member 84 also includes an outwardly disposed finger portion 96 engageable with a stop assembly 99 disposed adjacent the operative braking position of the brake arm 84. The stop assembly 99 includes a first bracket 100 fixed to the base 20 and a second bracket 101 in turn fixed to the first bracket 100. The pair of brackets 100, 101 are operable for confining a resilient cushion 103 of polyurethane foam while the second bracket 101 provides a supporting flange 104 for a flexible and resilient pad 105 engageable by the finger portion 96 of the brake arm member. The flexible pad 105 is laminated and includes a solid but flexible polyurethane layer 106 and a polypropylene felt layer 107. The laminated pad 105 is fixed at one end 108 to the bracket flange 104 and is free to move relative to a supporting surface 109 of the second bracket 101 at the other end upon engagement and movement of the pad by the brake arm member 84. The finger portion 96 is engageable with the polypropylene felt layer 107 to achieve the proper frictional characteristics under varying operating conditions.

The second bracket 101 also defines a projecting portion 110 engageable by the backside of the V-belt 73 upon movement of the brake arm 84 to its braking position substantially as shown in FIG. 4. Engagement of the belt 73 with the projecting portion 110 tends to effect a reverse bend in the belt and to force the belt 73 into the V-groove 95 for increasing the braking drag on the belt 73.

Referring to FIGS. 2 and 4, there is shown a switch 113 mounted juxtaposed the brake arm 84 in its first position as in FIG. 2. The switch 113 is mounted on the base 20 in a relatively fixed position by a bracket 114. The bracket 114 also provides the stop 92 that includes an upwardly extending flange 115 supporting a resilient pad 116 engageable by the brake arm 84 in the position shown in FIG. 2. The switch 113 is in a circuit controlling energization of the motor 50 and in the position of FIG. 2 the switch 113 is actuated to a condition for enabling energization of the drive motor 50. Upon movement of the brake arm 84 away from the switch button 117 as in FIG. 4, the switch 113 operates to a second condition for preventing energization of the drive motor 50 while the brake arm 84 is in the braking position.

By way of further explanation, the operation of the centrifugal extractor and the operation of the control system for decreasing the speed of rotation of the spinner assembly 42 will now be explained. The motor 50 is operable for accelerating and driving the spinner assembly 42 through the V-belt 73 engageable with the driven pulley 40 and with the movably mounted pump pulley 55. With the motor 50 operating in a clockwise direction and the belt 73 moving as indicated by the arrow 111 in FIGS. 2 and 4, the first leg 112 of the belt 73 extending between the motor pulley 53 and the driven pulley 40 assumes a slack or loose side condition.

It has been previously indicated that the brake arm member 84 is positioned for little or no engagement with the belt 73. During acceleration of the spinner assembly 42 by the motor 50, however, the belt 73 tends to move further away from the brake arm 84 and therefore the frictional drag between the belt 73 and the V-groove 95 is at a minimum and therefore does not hinder acceleration of the spinner assembly 42.

Once movement of the brake arm 84 is initiated, the drag between the belt 73 and the V-groove 95 builds up rapidly and the movable brake arm 84 is moved quickly from the first position to the second braking position. The brake thus operates automatically in response to the overdriving of the motor 50 by the spinner assembly 42.

The spinner assembly 42 in the instant embodiment is accelerated toward and reaches an approximate operating speed of 2,000 r.p.m. During this normal motor driven operation, the movable brake arm member 84 is lightly engaged with the belt 73 in its loose side condition and there is relatively low frictional drag between the belt 73 and the brake arm 84.

Upon deenergization of the motor 50, the motor rotor and motor pulley 53 immediately start to decelerate. The spinner assembly 42, however, has a relatively large rotating mass and therefore decreases in speed more slowly and overdrives the motor 50 to effectively become the driver. The spinner assembly 42 could also be responsive to accelerating forces from power sources other than the motor 50 for overdriving the motor 50. With the spinner assembly 42 effectively driving the motor 50, the belt leg 112 between the motor pulley 53 and the extractor pulley 40 assumes a tight side condition. The change to a tight side condition causes the belt 73 to immediately pickup the brake arm 84 through a rather substantial increase in drag between the belt 73 and the V-groove 95 of the brake arm 84 and causes the brake arm 84 to move from the position shown in FIG. 2 toward the position shown in FIG. 4.

Continuing the explanation of the brake operation, in the position of FIG. 4, the belt 73 is forced down into the V-groove 95 by engagement with the projecting portion 110 of the stop assembly 99 and a still further substantial increase in the amount of frictional drag is supplied to the belt 73 for braking or reducing the speed of rotation of the spinner assembly.

It will be seen that the stop 70 on the pivotal operation of the movable pump pulley 55 comes into play during the braking operation because, in the absence of idler stop means or other belt tension control means, the pump assembly 54 would continue to move inwardly and provide slack on the belt leg 112 between the driving pulley 53 and the driven pulley 40. In the present embodiment, however, wherein the idler stop 70 is provided, the pump assembly 54 is movable only as far as the finger 71 permits so that movement of the brake arm 84 from the first position to the second position increases the amount of tension on the belt leg 112 between the motor pulley 53 and the container pulley 40 so that the increased drag is applied to the belt 73.

As an alternate to, or in addition to, the braking function, the movement of the movable arm member 84 could be used for initiating other control functions. For example, other mechanical or electrical systems could be connected to or actuated by the brake arm 84 as it moves between the first and the second positions. Such functions might include those that are responsive to, or related to, the energization and deenergization of the motor 50 or rotation of the fabric container 19.

Referring again to the stop assembly 99 in FIGS. 2, 4, and 6, it is seen that, upon movement of the brake arm 84 from the first position as shown in FIG. 2 to its second position shown in FIG. 4, the outwardly disposed brake arm finger 96 engages the flexible pad 105 and compresses the resilient cushion 103. The resilient pad 105 and cushion 103 function as a stop but in addition the resiliency of the pad 105 and cushion 103 functions as a biasing force assisting the biasing spring 94 for initiating the return of the brake arm 84 from the position shown in FIG. 4 to the position shown in FIG. 2 upon the completion of the braking operation. Upon the belt 73 coming to a substantially complete stop, the leg 112 of the belt 73 between the motor pulley 53 and the container pulley 40 is relaxed so that the combined biasing force of the spring 94, the resilient pad 105, and cushion 103 is sufficient to return the movable brake arm 84 to the first position.

By way of comparison, the spinner assembly 42 forming a part of the laundry machine 10 shown in this application is operable for coasting from its full speed of 2,000 r.p.m. to a stop condition in approximately 20 to 25 seconds. The braking device shown as a preferred embodiment of this invention is operable for reducing the speed of rotation of the spinner assembly to a stop in approximately three seconds. This braking operation dissipates approximately three-fourths horsepower in reducing the speed of the spinner assembly from 2,000 r.p.m. to 0 r.p.m.

As previously indicated, movement of the brake arm 84 from the first position shown in FIG. 2 to the second braking position shown in FIG. 4 permits actuation of the base-mounted switch 113 to the open condition for preventing energization of the motor 50. Only after the return of the brake arm 84 to the first position may the motor 50 again be energized for rotating the fabric container. As previously shown, the brake arm 84 will remain in the braking position until the belt 73 comes to a substantially complete stop and thus the provision of the switch 113 for actuation by the brake arm effectively provides a brake-responsive motor control in which once the motor 50 is deenergized it remains deenergized until the braking operation is complete.

This control system, therefore, effectively avoids the momentary power interruption problems associated with the belt brake mechanism disclosed herein. More specifically, if the control of the instant invention were not used and there was a momentary interruption of power followed by the restoration of the power, the brake mechanism would be actuated and the motor would be reenergized so that a condition would be created in which both brake and the motor would operate. This situation must be avoided because of potential damage to the motor or to the belt resulting from overloading conditions.

It is therefore seen that the braking and control system disclosed herein provides unique advantages over the systems shown in the prior art. The instant invention provides a control system useful with a self-actuating braking device effectively responsive to the deenergization of the motor and operable for preventing reenergization of the motor during operation of the self-actuating braking device. The control effectively prevents damage to the motor and belt of the type which could result from reenergization of the motor while the belt brake device is still engaged.

In the drawings and specification, there has been set forth a preferred embodiment of the invention and, although specific terms are employed, these are used in a generic and descriptive sense only and not for purposes of limitation. Changes in form and the proportion of parts as well as the substitution of equivalents are contemplated as circumstances may suggest or render expedient without departing from the spirit or scope of this invention.

I claim:

1. In a centrifugal extractor, the combination comprising; a rotatable container; drive means for rotating said rotatable container; endless belt means drivingly connecting said drive means to said rotatable container; belt brake means including a movably mounted brake member engageable with said belt means and self actuatable from a first to a second position for applying a braking drag to said endless belt means to effect a speed reduction of said rotatable container responsive to an overdriving of said drive means by said container; and control means actuated by the brake member for deenergizing said drive means and maintaining said drive means deenergized during the braking operation.

2. In a centrifugal extractor as defined in claim 1 wherein said control means is responsive to movement of said movably mounted brake member from said first position.

3. In a centrifugal extractor as defined in claim 1 wherein said control means includes a switch connected in a circuit with said drive means and responsive to movement of said movably mounted brake member from said first position for opening the circuit to said drive means.

4. In a centrifugal extractor, the combination comprising: a rotatable container; drive means for rotating said rotatable container; endless belt means drivingly connecting said drive means to said rotatable container, said endless belt means including a first leg having a loose side condition when said drive means is rotating said rotatable container in a first direction and a tight side condition when said rotatable container overdrives said drive means in said first direction; a movably mounted member engageable with said first leg and operable from a first position to a second position responsive to a predetermined frictional drag between said movably mounted member and said belt means, said movably mounted member being responsive to the tight side condition for applying said predetermined frictional drag whereby said movably mounted member operates to said second position, said movably mounted member being operable in said second position for effecting an auxiliary control function in the operation of said centrifugal extractor; and control means operable while said movably mounted member is in said second position for preventing energization of said drive means.

5. In a centrifugal extractor as defined in claim 4 wherein said auxiliary control function comprises a braking operation in which said movably mounted member is operable for applying substantially increased frictional drag to said belt means and wherein said control means is operable for maintaining said drive means deenergized until said belt means comes substantially to a stop.

6. In a centrifugal extractor as defined in claim 4 wherein said control means includes a switch means connected in a circuit with said drive means and responsive to movement of said movably mounted member from said first position to said second position.

7. In a centrifugal extractor as defined in claim 6 wherein said switch means is positioned juxtaposed said movably mounted member and engageable by the movably mounted member in said first position.

8. In a centrifugal extractor, the combination comprising: rotatable means including a container and a driven pulley; motor means including a driving pulley and operable for rotating said rotatable means; endless belt means drivingly connecting said driving and driven pulleys, a first leg of said endless belt means at said driving pulley having a loose side condition when said motor means is driving said rotatable means in a first direction and a tight side condition when said rotatable means overdrives said motor means in said first direction; a movably mounted brake member having a first position for relatively no frictional engagement with the first leg in said loose side condition and responsive in said first position to the change of said first leg from the loose side condition to the tight side condition for moving to a second position and applying relatively great frictional drag to said belt means to reduce the speed of rotation of said rotatable means; and switch means for maintaining said motor means deenergized while said movably mounted brake member is in said second position.

9. In centrifugal extractor as defined in claim 8 wherein said switch means is positioned juxtaposed to said movably mounted brake member and engageable by said brake member in said first position for operation to a closed condition and responsive to movement of said movably mounted brake member from the first position for operating to an open condition for preventing energization of said motor means.

10. In a centrifugal extractor as defined in claim 9 wherein said movably mounted brake member is maintained in said second position until said belt means comes substantially to a stop whereby said motor means is maintained deenergized until said belt means and said rotatable means comes to a stop.

* * * * *